United States Patent
Chang

(10) Patent No.: US 8,035,770 B2
(45) Date of Patent: Oct. 11, 2011

(54) ELECTRONIC DEVICE AND LIQUID CRYSTAL DISPLAY THEREOF HAVING A FRAME WITH ONE ELASTIC POSITIONING ELEMENT

(75) Inventor: Chi-Hung Chang, Miaoli (TW)

(73) Assignee: Chimei Innolux Corporation, Miao-Li County (TW)

( * ) Notice: Subject to any disclaimer, the term of this patent is extended or adjusted under 35 U.S.C. 154(b) by 269 days.

(21) Appl. No.: 12/415,438

(22) Filed: Mar. 31, 2009

(65) Prior Publication Data

US 2009/0244434 A1    Oct. 1, 2009

(30) Foreign Application Priority Data

Mar. 31, 2008  (TW) ................................ 97111647 A

(51) Int. Cl.
*G02F 1/1333*    (2006.01)

(52) U.S. Cl. .......................................... 349/58

(58) Field of Classification Search ............... 349/52, 349/58, 59, 65, 68, 69, 113
See application file for complete search history.

(56) References Cited

U.S. PATENT DOCUMENTS

| | | | | |
|---|---|---|---|---|
| 5,703,665 A | * | 12/1997 | Muramatsu et al. | 349/60 |
| 6,339,457 B1 | * | 1/2002 | Won | 349/58 |
| 6,473,146 B1 | * | 10/2002 | Lee | 349/152 |
| 6,848,800 B2 | * | 2/2005 | Kim | 362/26 |
| 7,599,016 B2 | * | 10/2009 | Lo et al. | 349/56 |
| 2003/0043314 A1 | * | 3/2003 | Lee et al. | 349/65 |
| 2007/0121026 A1 | * | 5/2007 | Chang et al. | 349/58 |

* cited by examiner

*Primary Examiner* — Akm Ullah
(74) *Attorney, Agent, or Firm* — Birch, Stewart, Kolasch & Birch, LLP

(57) ABSTRACT

A liquid crystal display includes a panel, a frame, a bottom cover, and a top cover. The panel has at least one protrusion. The frame has at least one elastic positioning element abutting against the protrusion. The bottom cover accommodates the frame and the panel. The top cover covers the bottom cover.

14 Claims, 9 Drawing Sheets

ELECTRONIC DEVICE AND LIQUID CRYSTAL DISPLAY THEREOF HAVING A FRAME WITH ONE ELASTIC POSITIONING ELEMENT

CROSS REFERENCE TO RELATED APPLICATIONS

This application claims priority of Taiwan Patent Application No. 097111647, filed on Mar. 31, 2008, the entirety of which is incorporated by reference herein.

BACKGROUND OF THE INVENTION

1. Field of the Invention

The present invention relates to a liquid crystal display, and in particular relates to a liquid crystal display with a narrow frame and a positioning device by which the size of the frame is reduced and the liquid crystal display is miniaturized.

2. Description of the Related Art

Referring to FIG. 1, an exploded view of a conventional liquid crystal display, and FIG. 2, a top view of the conventional liquid crystal display with a top cover removed, the conventional liquid crystal display 10 comprises a panel 101, a frame 102, a top cover 103, and a bottom cover 104. The bottom cover 103 accommodates the frame 102 and the panel 101, and the top cover 106 covers the bottom cover 103. The frame 102 has a surrounding part 102a surrounding the panel 101 and a supporting part 102b disposed below the panel 101 (as shown in FIG. 3), and the surrounding part 102a and the supporting part 102b are one-body type.

For the conventional liquid crystal display 10, the frame 102 surrounds the panel 101 to position the panel 101 (in X direction and Y direction) in the frame 102. Thus, the length and the width of the liquid crystal display 10 are determined by the bottom cover 103, the surrounding part 102a of the frame 102, and the panel 101 (as shown in FIG. 3). Clearly, the conventional liquid crystal display 10 can not contain a narrow frame to reduce the size of the frame and conform to the requirement of a miniaturized product.

BRIEF SUMMARY OF THE INVENTION

A detailed description is given in the following embodiments with reference to the accompanying drawings.

The invention provides a liquid crystal display comprising a panel, a frame, a bottom cover, and a top cover. The panel has at least one protrusion. The frame has at least one elastic positioning element abutting against the protrusion. The bottom cover accommodates the frame and the panel. The top cover covers the bottom cover.

The frame further has a wall, and the elastic positioning element is extended from the wall.

The elastic positioning element is a hook engaging the protrusion.

An end of the hook has a lead angle.

The frame is made of plastic materials.

The frame is made of metal.

The panel has a displaying part and a non-displaying part adjoining the displaying part.

The non-displaying part has a top surface, and the protrusion is disposed on the top surface.

The protrusion is made of insulating materials.

The protrusion is a blank circuit board.

The protrusion has at least one lead angle.

The liquid crystal display further comprises an upper prism sheet, a bottom prism sheet, a diffuser, a light guide plate, a reflector, and a plurality of light emitting diodes. The bottom prism sheet is disposed below the upper prism sheet. The diffuser is disposed below the bottom prism sheet. The light guide plate is disposed below the diffuser. The reflector is disposed below the light guide plate. The light emitting diodes are toward the incident edge surface of light guide plate.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 4:
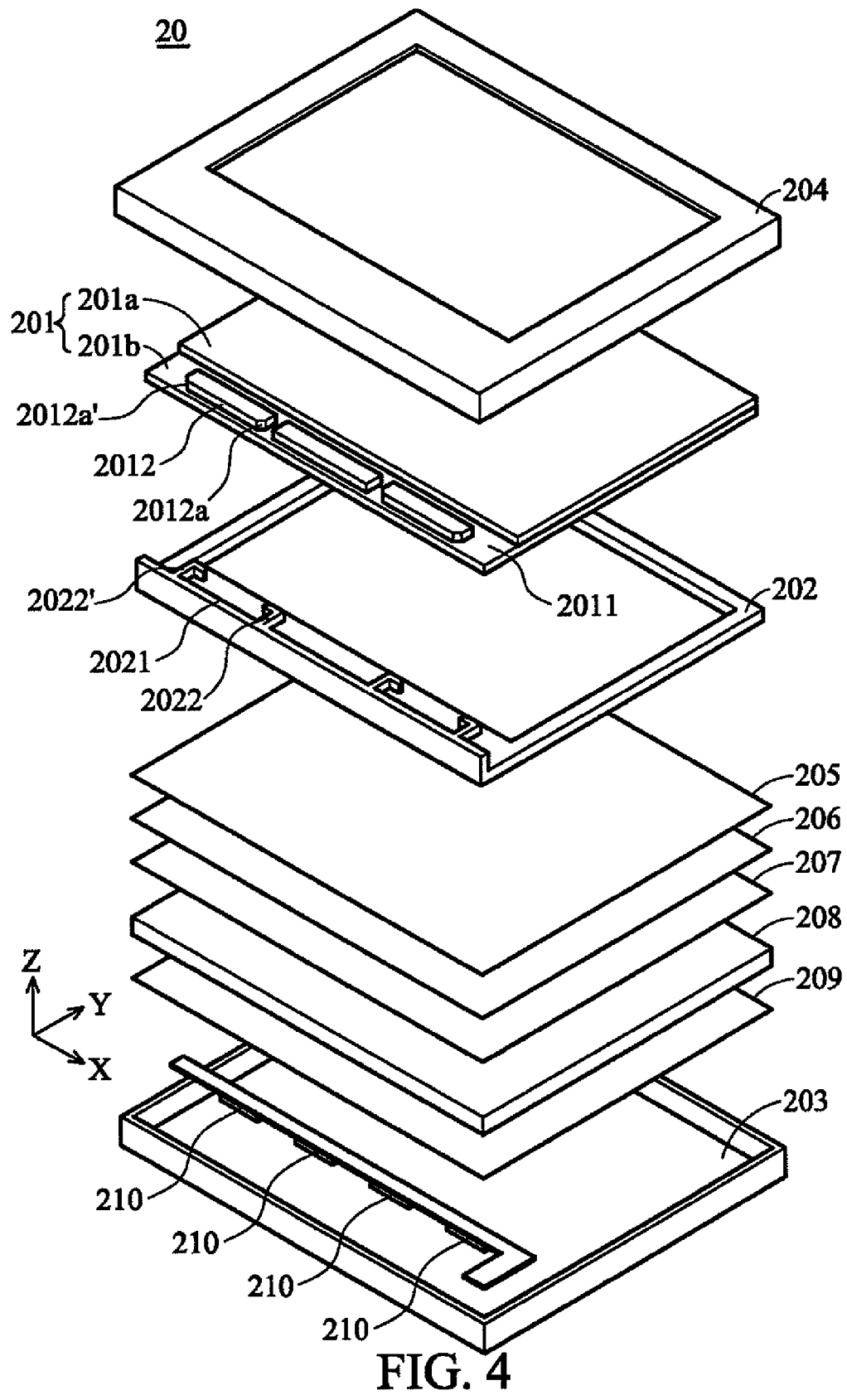
FIG. 4 is an exploded view of a liquid crystal display in accordance with an embodiment of the invention.
Figure 5:
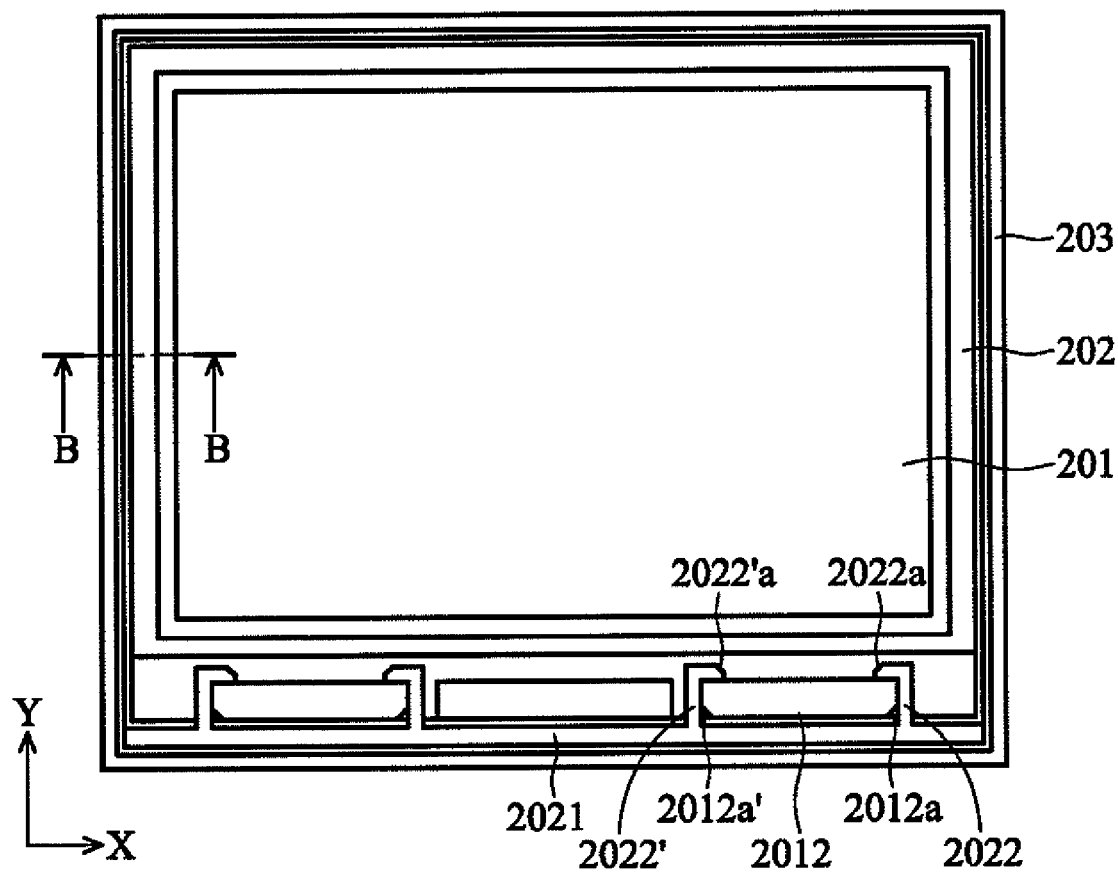
FIG. 5 depicts a top view of the liquid crystal display of FIG. 4 with a top cover removed to clearly show the structure of the liquid crystal display.
Figure 6:
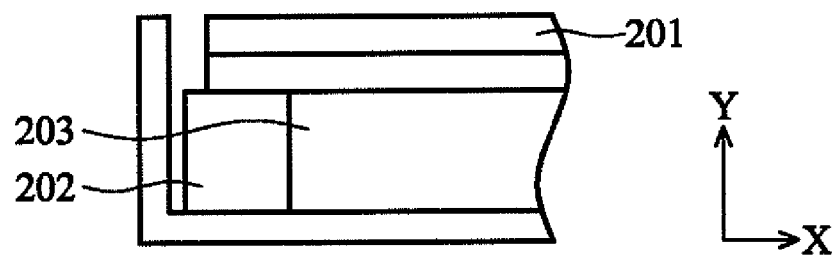
FIG. 6 is an A-A sectional view of FIG. 5.

FIG. 4 depicts a liquid crystal display in accordance with an embodiment of the invention. FIG. 5 depicts a top view of the liquid crystal display of FIG. 4 with a top cover removed to clearly show the structure of the liquid crystal display. FIG. 6 is a B-B sectional view of FIG. 5. Referring to FIG. 4, FIG. 5, and FIG. 6, the liquid crystal display 20 comprises a panel 201, a frame 202, a bottom cover 203, a top cover 204, an upper prism sheet 205, a bottom prism sheet 206, a diffuser 207, a light guide plate 208, a reflector 209, and a plurality of light emitting diodes 210. Each element is described in detail in the following.

The panel 201 is disposed on the frame 202. The upper prism sheet 205 is disposed below the frame 202. The bottom prism sheet 206 is disposed below the upper prism sheet 205. The diffuser 207 is disposed below the bottom prism sheet 206. The light guide plate 208 is disposed below the diffuser 207. The reflector 209 is disposed below the light guide plate 208. The light emitting diodes 210 are toward the incident edge surface of light guide plate 207. The bottom cover 203 accommodates the frame 202, the upper prism sheet 205, the bottom prism sheet 206, the diffuser 207, the light guide plate 208, the reflector 209, and the plurality of light emitting diodes 210, and the panel 201, and the top cover 204 covers the bottom cover 203 wherein the frame 202 may be made of plastic or metal.

The panel 201 has a displaying part 201a and a non-displaying part 201b adjoining the displaying part 201a. The non-displaying part 201b has a top surface 2011 and at least one protrusion 2012 disposed on the top surface 2011 of the non-displaying part 201b, wherein the protrusion 2012 is made of insulating materials (e.g. a blank circuit board) and the protrusion 2012 has lead angels 2012a, 2012a'.

The frame 202 has a wall 2021 and elastic positioning elements 2022, 2022' extended from the wall 2021 and abutting against the protrusion 2012 of the panel 201, wherein the elastic positioning elements 2022, 2022' may be hooks and engage the protrusion 2012, and ends of the elastic positioning elements 2022, 2022' have lead angles 2022a, 2022'a, respectively.

Figure 7A:
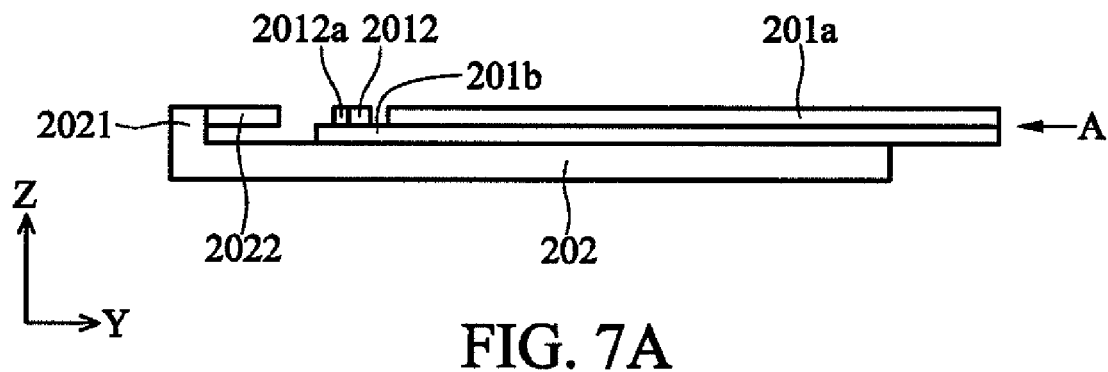
FIGS. 7A, 8A, and 9A are side views of an assembly process of a panel and a frame in accordance with an embodiment of the invention.
Figure 7B:
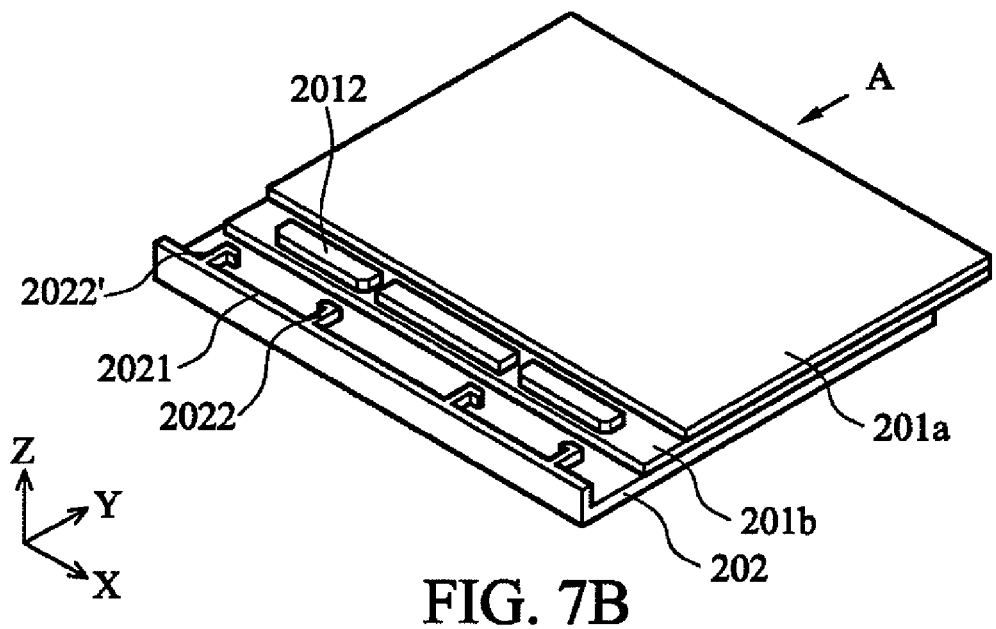
FIGS. 7B, 8B, and 9B are stereograms corresponding to FIGS. 7A, 8A, and 9A, respectively.
Figure 8A:
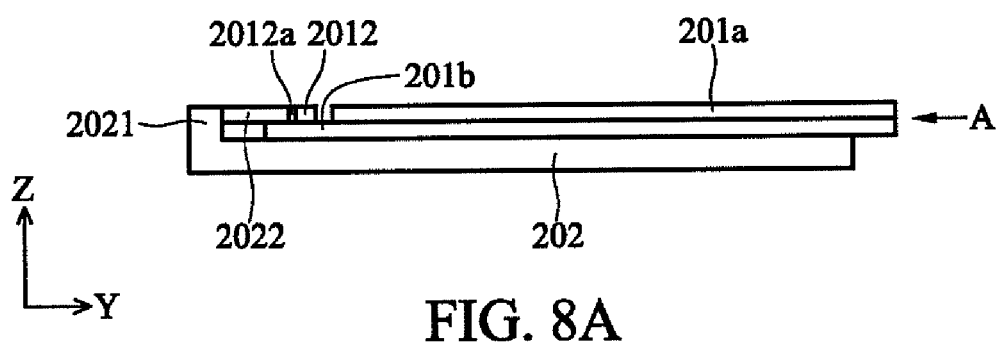
Figure 8B:
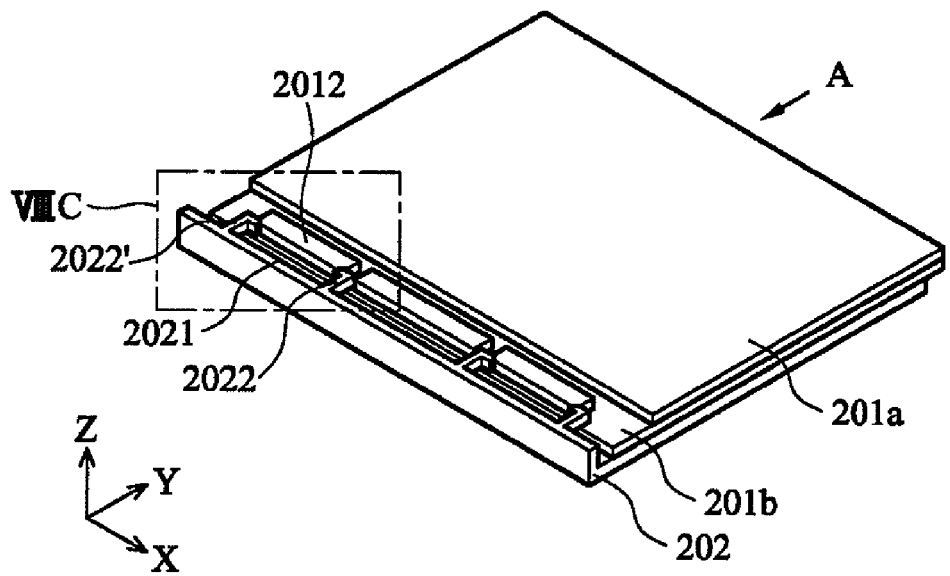
Figure 8C:
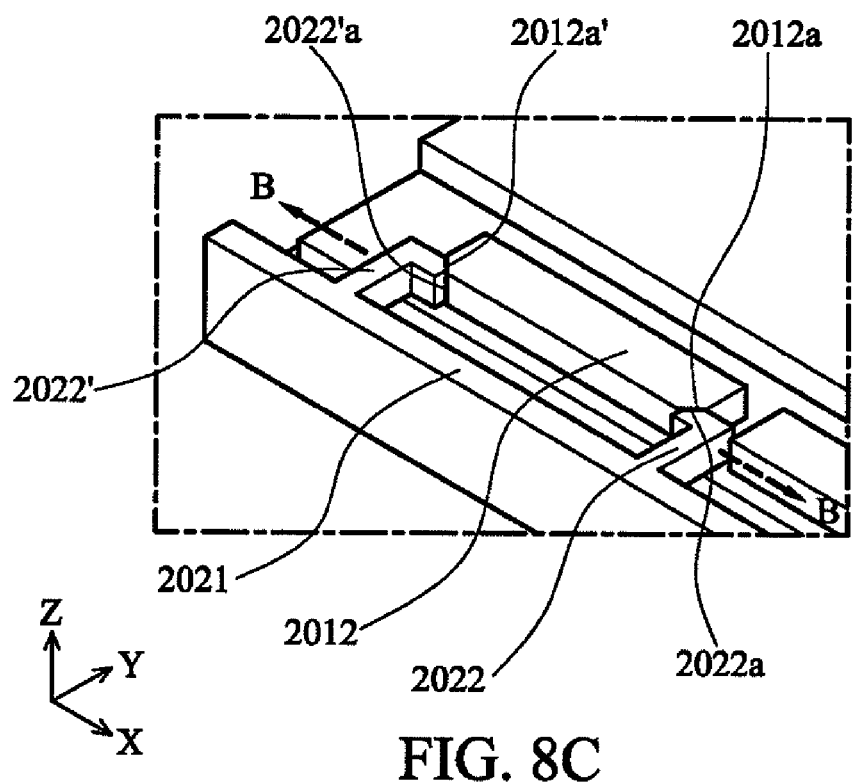
FIG. 8C is a partially enlarged view of an elastic positioning element abutting against a protrusion of VIII of FIG. 8B.
Figure 9A:
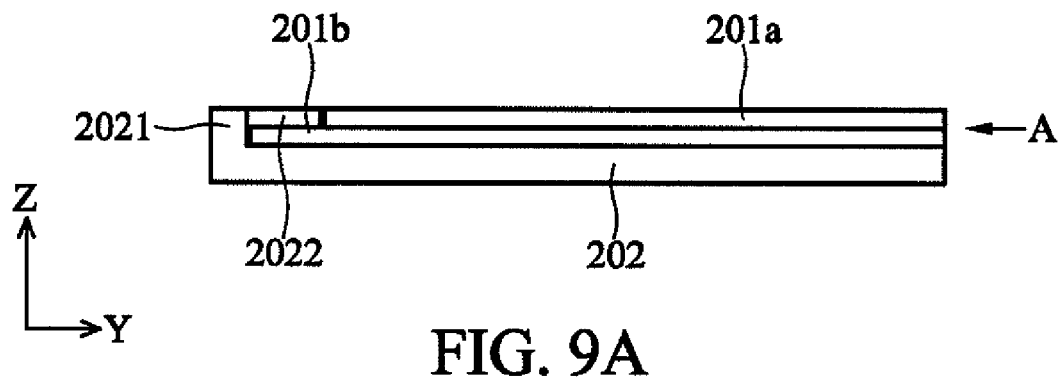
Figure 9B:
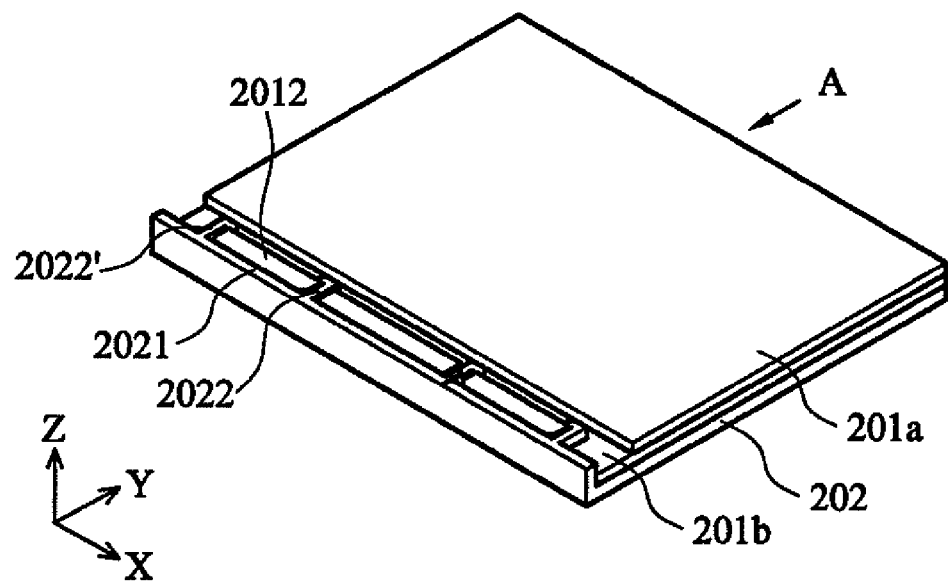

FIGS. 7A, 8A, and 9A show side views of an assembly process of a panel and a frame in accordance with an embodiment of the invention, FIGS. 7B, 8B, and 9B show stereograms corresponding to FIGS. 7A, 8A, and 9A, respectively, and FIG. 8C shows a partially enlarged view of an elastic positioning element abutting against a protrusion of VIII of FIG. 8B. The panel 201 is disposed on the frame 202 and pushed in a direction of arrow A. When the protrusion 2012 with the lead angles 2012a, 2012a' abuts against the elastic positioning elements 2022, 2022' with the lead angles 2022a, 2022'a, the elastic positioning elements 2022, 2022' are pressed by the protrusion 2012 to deform in directions of arrow B and arrow B', respectively. Then, the protrusion 2012 is guided into a space between the elastic positioning elements 2022, 2022' through lead angels 2012a, 2012a' and lead angles 2022a, 2022'a, and elastic positioning elements 2022, 2022' fixedly engage the protrusion 2012 in the space between the elastic positioning elements 2022, 2022' to complete the assembly process of the panel 201 and the frame 202 and the location of the panel 201 (in X direction and Y direction).

Figure 10:
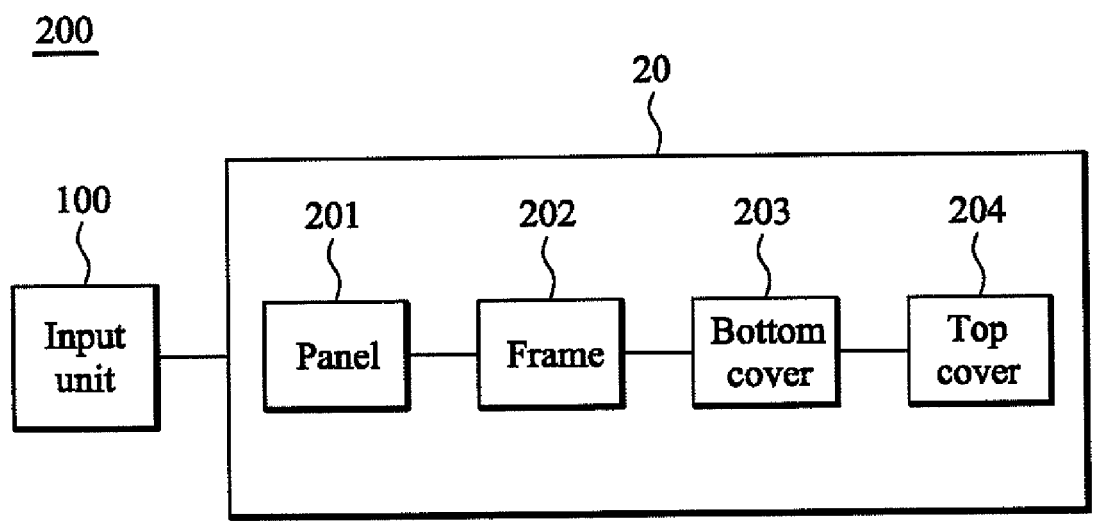
FIG. 10 is a schematic view of an electronic device containing a liquid crystal display of the invention.

Referring to FIG. 10, the liquid crystal display 20 of this invention comprises a panel 201, a frame 202, a bottom cover 203, and a top cover 204.

The foregoing liquid crystal display 20 may be applied in an electronic device 200. In the electronic device 200, the liquid crystal display 20 is coupled to an input unit 100, and the input unit 100 provides an input to the liquid crystal display 20 to show images.

The foregoing electronic device 200 may be a mobile phone, a digital camera, a personal digital assistant, a notebook computer, a desktop computer, a television, a car display, or a portable digital versatile disk player.

Figure 1:
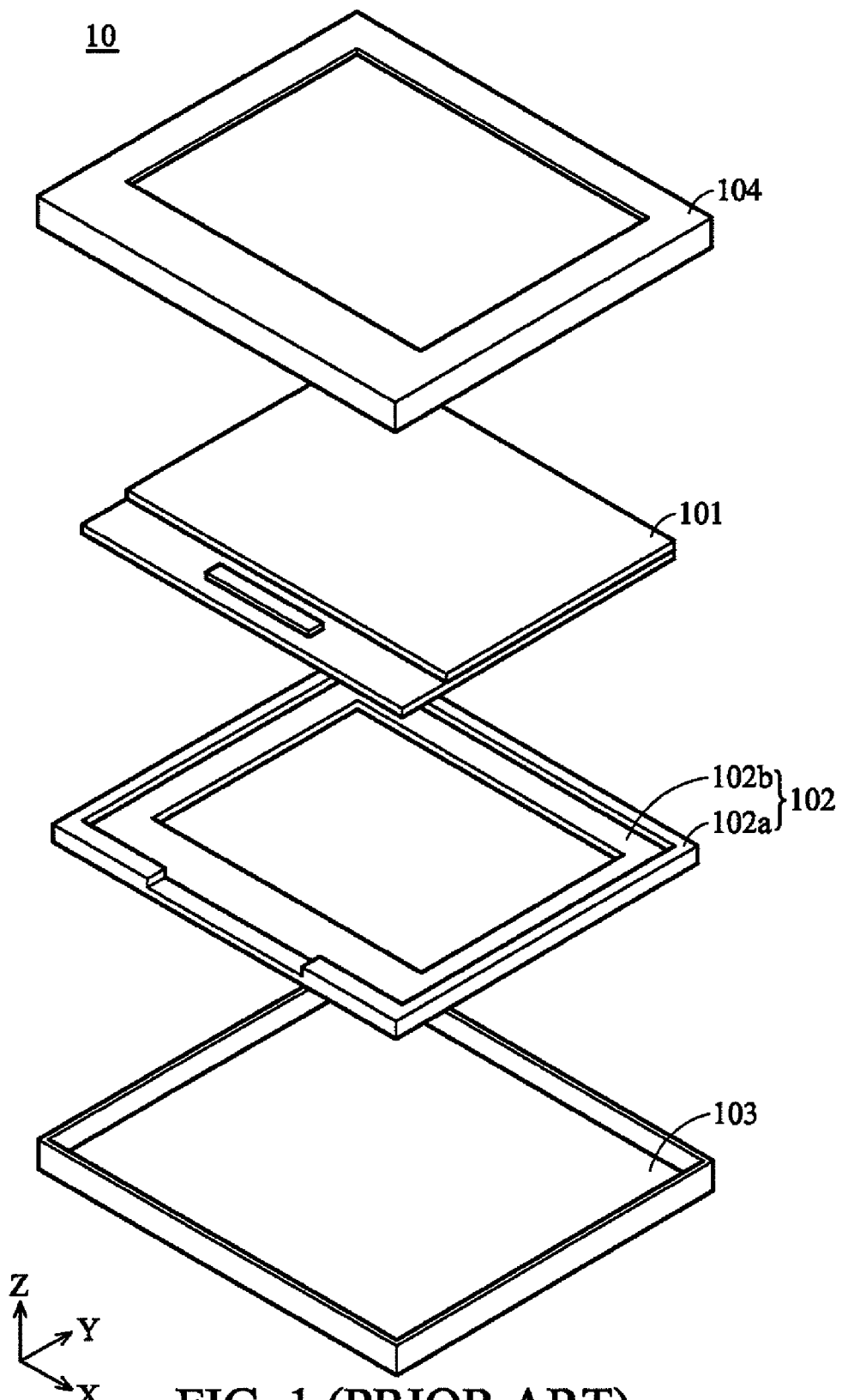
FIG. 1 is an exploded view of a conventional liquid crystal display.
Figure 2:
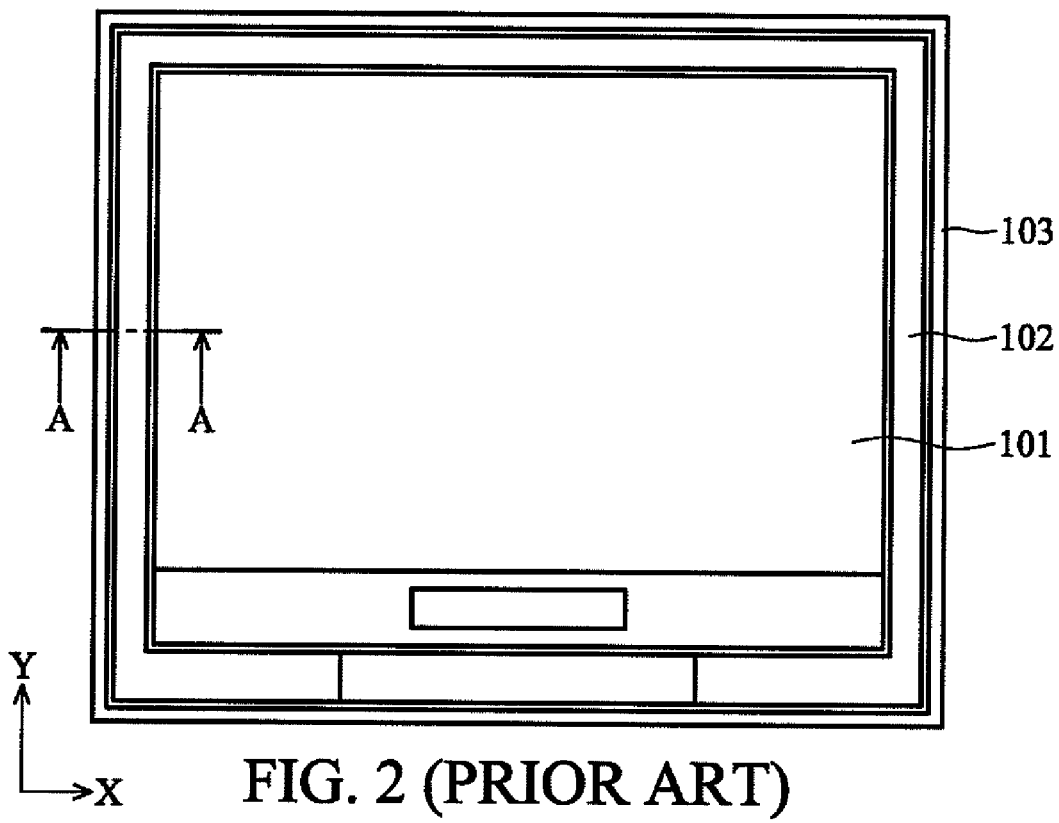
FIG. 2 depicts a top view of the conventional liquid crystal display with a top cover removed to clearly show the structure of the conventional liquid crystal display.
Figure 3:
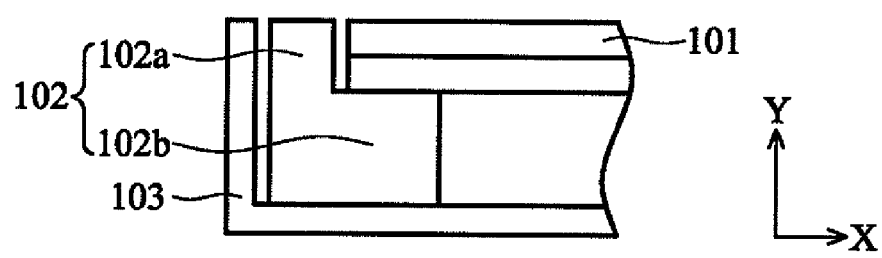
FIG. 3 is an A-A sectional view of FIG. 2.

From the above description, the invention substitutes the protrusion 2012 of the panel 201 and the elastic positioning elements 2022, 2022' of the frame 202 for the surrounding part 102a of the frame 102 of the conventional liquid crystal display 10. Therefore, the thickness of the surrounding part 102a of the conventional liquid crystal display 10 (as shown in FIG. 3) can be eliminated, the problem of the location of the panel 201 (in X direction and Y direction) can be solved, and the size of the frame 202 can be reduced to conform to the miniaturized product requirement.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid crystal display comprising:
   a panel having at least one protrusion;
   a frame having at least one elastic positioning element abutting against the protrusion to restrict the panel from moving on a base plane, wherein the panel is parallel to the base plane;
   a bottom cover accommodating the frame and the panel; and
   a top cover covering the bottom cover.

2. The liquid crystal display as claimed in claim 1, wherein the frame further has a wall, and the elastic positioning element is extended from the wall.

3. The liquid crystal display as claimed in claim 1, wherein the elastic positioning element is a hook engaging the protrusion.

4. The liquid crystal display as claimed in claim 3, wherein an end of the hook has a lead angle.

5. The liquid crystal display as claimed in claim 1, wherein the frame is made of plastic materials.

6. The liquid crystal display as claimed in claim 1, wherein the frame is made of metal.

7. The liquid crystal display as claimed in claim 1, wherein the panel has a displaying part and a non-displaying part adjoining the displaying part.

8. The liquid crystal display as claimed in claim 7, wherein the non-displaying part has a top surface, and the protrusion is disposed on the top surface.

9. The liquid crystal display as claimed in claim 1, wherein the protrusion is made of insulating materials.

10. The liquid crystal display as claimed in claim 9, wherein the protrusion is a blank circuit board.

11. The liquid crystal display as claimed in claim 1, wherein the protrusion has at least one lead angle.

12. The liquid crystal display as claimed in claim 1 further comprising:
   an upper prism sheet disposed below the frame;
   a bottom prism sheet disposed below the upper prism sheet;
   a diffuser disposed below the bottom prism sheet;
   a light guide plate disposed below the diffuser;
   a reflector disposed below the light guide plate; and
   a plurality of light emitting diodes toward the incident edge surface of light guide plate.

13. An electronic device comprising:
   a liquid crystal display as claimed in claim 1; and
   an input unit, coupled to the liquid crystal display, providing an input to the liquid crystal display to show images.

14. The electronic device as claimed in claim 13, wherein the electronic device is a mobile phone, a digital camera, a personal digital assistant, a notebook computer, a desktop computer, a television, a car display, or a portable digital versatile disk player.

* * * * *